United States Patent [19]

Kojima

[11] Patent Number: 4,706,135
[45] Date of Patent: Nov. 10, 1987

[54] VIDEO RECORDING APPARATUS WITH EDITING AND MIXING OF DELAYED MONITORED VIDEO SIGNAL USING EQUIDISTANT RECORD, READ AND ERASE HEADS

[75] Inventor: Nobutoshi Kojima, Nagoya, Japan
[73] Assignee: Tokai Television Broadcasting Company Limited, Aichi, Japan
[21] Appl. No.: 817,550
[22] Filed: Jan. 10, 1986
[51] Int. Cl.⁴ ................... H04N 5/782; G11B 27/02
[52] U.S. Cl. ............................. 360/14.1; 360/33.1; 360/106; 360/107
[58] Field of Search ..................... 360/14.1–14.3, 360/33.1, 38.1, 84, 107, 109, 106; 358/311

[56] References Cited

U.S. PATENT DOCUMENTS

| | | | |
|---|---|---|---|
| 3,152,223 | 10/1964 | Wessels | 360/38.1 X |
| 3,157,739 | 11/1964 | Okamura | 360/84 X |
| 3,925,815 | 12/1975 | Lemelson | 360/14.3 |
| 4,163,262 | 7/1979 | Kaemmerer | 360/14.1 |
| 4,251,838 | 2/1981 | Saito | 360/107 X |
| 4,389,680 | 6/1983 | Gramling | 360/14.1 |
| 4,404,605 | 9/1983 | Sakamoto | 360/109 X |

Primary Examiner—Raymond F. Cardillo
Assistant Examiner—Wayne R. Young
Attorney, Agent, or Firm—Parkhurst & Oliff

[57] ABSTRACT

A video recording apparatus of one-inch helical scan type including rotary and stationary drums arranged coaxially, reproducing, recording and erasing magnetic heads arranged equidistantly around the rotary drum in this order viewed in a rotational direction of the rotary drum, and a magnetic tape feeding mechanism for feeding a magnetic tape around the drums along a helical path. By means of the recording head a video signal is recorded on the magnetic tape in such a manner that a video signal of one field is recorded as a single inclined track. The reproducing head is shifted in an axial direction of the drums with respect to the recording head by such an amount that the reproducing and recording heads scan adjacent tracks simultaneously. The apparatus further includes a delay circuit for delaying a video signal reproduced by the reproducing head by ⅔ field period and a mixing amplifier for selectively supplying a delayed video signal to the recording head. Thus, when the delayed video signal is recorded by the recording head, it is recorded on the magnetic tape at the same position where the relevant video signal has been reproduced by the reproducing head. A video signal generated from another VTR, TV camera or character generator is supplied to the recording head via the mixing amplifier and is recorded on the video tape to effect the video editing.

9 Claims, 12 Drawing Figures

FIG_5A

FIG_5B

VIDEO RECORDING APPARATUS WITH EDITING AND MIXING OF DELAYED MONITORED VIDEO SIGNAL USING EQUIDISTANT RECORD, READ AND ERASE HEADS

BACKGROUND OF THE INVENTION

Field of the Invention and Related Art Statement

The invention relates generally to a video signal recording and reproducing technique, and more particularly to a video recording apparatus for effecting video edition and superimposition.

There has been often used a video tape recorder (VTR) for the production of programs in TV broadcasting. In such known recorders, scenes picked-up by one or more television cameras are recorded on one or more video tapes by a VTR and these video tapes are edited to make a master video tape for broadcasting. To edit the tapes there has been developed a splice editing technique in which a tape is cut into portions and necessary portions are spliced and electronically edited with the aid of an editing VTR. The latter system is now widely used because automatic editing by computer control is possible and various special effects can be given in addition to simple cuts. Further, when producing a program for broadcasting, there is frequently used superimposition for superimposing characters, patterns and the like on the image.

Figure 1:
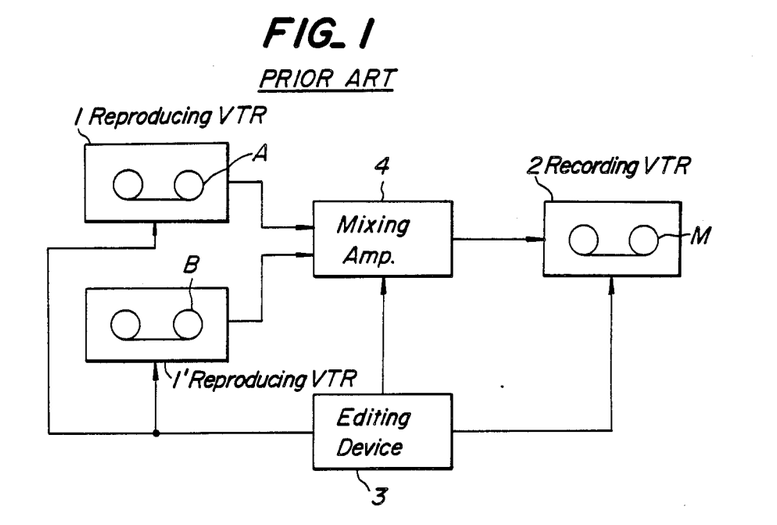
FIG. 1 is a block diagram showing a known video editing system.

FIG. 1 shows a known typical electronic editing system, comprising two reproducing VTRs 1, 1', one recording VTR 2 and a mixing amplifier 4 arranged therebetween, the reproducing VTRs, recording VTR and mixing amplifier being controlled by an editing device 3. This system is usually called an A:B roll editing system. In this editing system, original tapes A and B (the original tape B is generally made by dubbing the original tape A) are loaded on the reproducing VTRs 1 and 1', respectively, and reproduced video signals are selectively recorded on a master tape M loaded on the VTR 2 through the mixing amplifier 4, so that images can be superimposed one upon the other, and the video effect is actively increased. However, this known system disadvantageously requires three sets of expensive VTRs.

Since the editing device 3 synchronously drives three VTRs, a considerably highly efficient synchronizing mechanism is necessary, and as a result, the greater number of required VTRs, the more expensive the editing system. Further, in the known editing system, even if a part of the master tape lasting only a few seconds is to be further edited, the whole program should be dubbed by loading the master tape in the reproducing VTR. Such dubbing takes a long operating time and causes inevitable deterioration of video signals.

Figure 2:
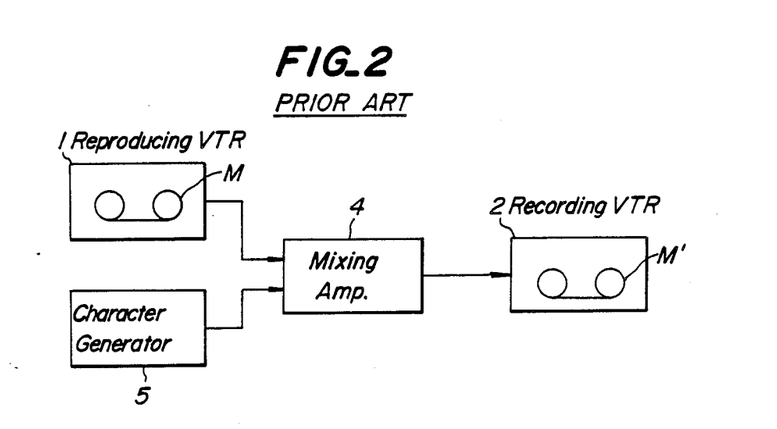
FIG. 2 is a block diagram illustrating a known character superimposing system.

FIG. 2 shows another known system for superimposing characters, patterns and the like on a part of the master tape which has already been edited. The edited master tape M is loaded on a reproducing VTR 1, a new master tape M' is loaded on a recording VTR 2, and character signals generated by a character generator 5 or a television camera is supplied to the recording VTR 2 through a mixing amplifier 4. Such a system requires two sets of VTRs only for superimposing characters, becomes considerably expensive, has to dub the whole program for superimposing characters on a part of the picture image, causes unnecessary deterioration of the video signal and takes a considerably long period of time for editing.

As described in the foregoing, the known video recording apparatus for editing requires many expensive VTRs, and is complicated, large and disadvantageously expensive. Further, since each time only a part of the program is to be subjected to superimposition and replacement, the whole program should be dubbed, the operation time becomes long and deterioration of the video signal cannot be avoided.

SUMMARY OF THE INVENTION

The invention has for its object to provide a novel and useful video recording apparatus which is simple and small in construction, moderate in price, and performs partial editing, superimposition and the like in a short time by minimizing the deterioration of the video signal.

A video recording apparatus according to the invention comprises means for feeding a magnetic tape along a predetermined path at a given speed in a given direction;

a recording magnetic head arranged on said magnetic tape feeding path for recording a video signal on the magnetic tape;

a reproducing magnetic head arranged on said magnetic tape feeding path at an upper stream position than the recording magnetic head viewed in said magnetic tape feeding direction for reproducing a video signal recorded on the magnetic head; and delay means for delaying the video signal reproduced by said reproducing magnetic head by such a time period that a video signal delayed by the delay means is recorded by said recording magnetic head on the magnetic tape at the same position where the relevant video signal is reproduced.

The video recording apparatus according to the invention can effect the recording simultaneously with the reproduction, and can record, for example, a delayed reproducing signal together with a video signal from a reproducing VTR or a character signal from a character generator or a television camera through a mixing amplifier, so that the necessary number of VTRs can be reduced. In this case, the video signal reproduced by the reproducing head is recorded at the same position as the original position, so that no special synchronization is required, and partial editing or superimposition of character signals on a partial picture can be done at such portion, and as a result, the deterioration of video signal by dubbing can be minimized. The video recording apparatus according to the invention can utilize various types of VTRs, and can preferably be applied to a one-inch helical scan type VTR. In a preferred embodiment, said recording head and reproducing head are mounted on a head drum together with an erasing head mutually separated by an angle of 120°, said magnetic tape being helically wound around said head drum for recording one field of a video signal as one inclined track, said reproducing head being positioned on the side of an upper stream from the recording head by n tracks (n=1, 2 . . . ) viewed from the magnetic tape feeding direction, and said delay means delays the video signal by a period of $(n-1+\frac{2}{3})$ field.

DESCRIPTION OF THE PREFERRED EMBODIMENTS

Figure 3:
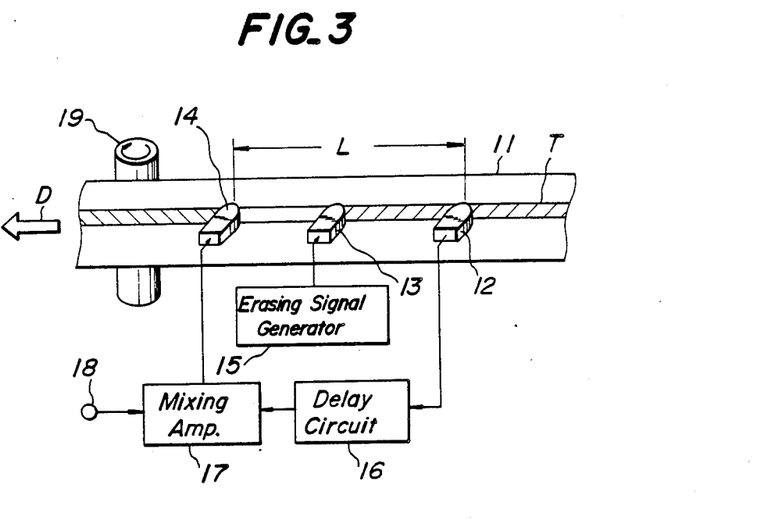
FIG. 3 is a schematic view depicting a principal construction of the video recording apparatus according to the invention.

FIG. 3 is a schematic diagram showing a fundamental construction of the video recording apparatus according to the invention. A magnetic tape 11 is fed at a given speed in the direction shown by an arrow D by means of a capstan 19, while reproducing head 12, erasing head 13 and recording head 14 are arranged in this order viewed in the magnetic tape feeding direction D. The erasing head 13 is connected to an erasing signal generator circuit 15 which can produce an erasing signal selectively, so that any desired tape portions may be selectively erased. A reproduced video signal from the reproducing head 12 is supplied to a mixing amplifier 17 through a delay circuit 16. To this mixing amplifier 17 can be also supplied a video signal from a reproducing VTR or a character signal from a character generator through an input terminal 18. An output signal of the mixing amplifier 17 is recorded on the magnetic tape 11 by the recording head 14.

According to the invention, the delay time of the delay circuit 16 is made equal to the time required for the magnetic tape 11 running over a distance L from the reproducing head 12 to the recording head 14. Therefore, the video signal reproduced from the magnetic tape 11 by the reproducing head 12 can be recorded on the magnetic tape 11 by the recording head 14 at the same position at which the video signal has been reproduced.

Figure 4A:
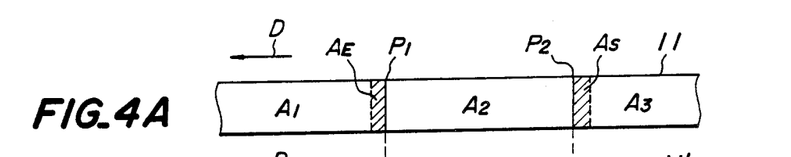
FIGS. 4A to 4D are schematic views for explaining the operation of the apparatus shown in FIG. 3.
Figure 4B:
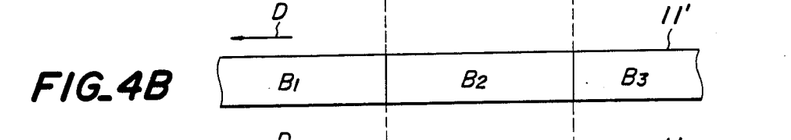

Now, the operation of the video recording apparatus will be explained. It is assumed that the video signal has been previously recorded on the magnetic tape 11 along a track T. This condition is shown in FIG. 4A. That is, scenes $A_1$, $A_2$, $A_3$ have been continously recorded on the magnetic tape 11. On the other hand, scenes $B_1$, $B_2$, $B_3$ are continuously recorded on another magnetic tape 11' as shown in FIG. 4B, and the scene $B_2$ is to be inserted on the tape 11' instead of the scene $A_2$. In this case, the tape 11' is loaded on another reproducing VTR (not shown) and its reproduced output signal is supplied to the mixing amplifier 17 through the input terminal 18. While the video signal of the first scene $A_1$ is reproduced by the reproducing head 12, there is no erasing nor recording after the reproducing head 12 reproduces a portion $A_E$ of the scene $A_1$ immediately before an edit-in point $P_1$ between the scenes $A_1$ and $A_2$ and the portion reaches the position of the erasing head 13, erasing is started.

Figures 4C, 4D:
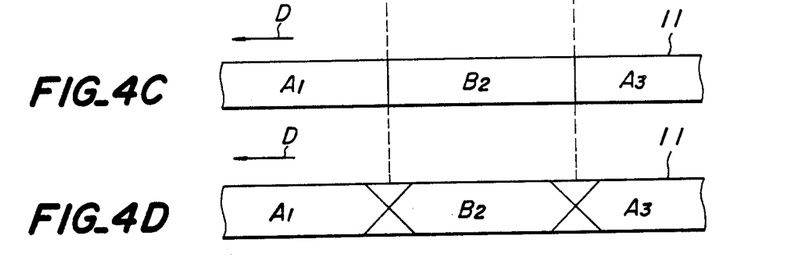

Then, when said portion $A_E$ arrives at the position of the recording head 14, the video signal reproduced by the reproducing head 12 and delayed by the delay circuit 16 is supplied to the recording head 14 through the mixing amplifier 17 and is recorded on the video tape 11 at the same position as that at which the relevant video signal has been previously recorded. In other words, the portion $A_E$ is dubbed on the same tape position. When the edit-in point $P_1$ reaches the recording head 14, the recording of the video signal of the portion $A_E$ reproduced by the reproducing head 11 is stopped and the video signal of the scene $B_2$ reproduced by another reproducing VTR is supplied to the recording head 14 through the input terminal 18 and mixing amplifier 17 and is recorded on the magnetic tape 11 by the recording head 14. After the reproducing head 12 has reproduced a portion $A_S$ of the scene $A_3$ immediately after an edit-out point $P_2$ between the scenes $A_2$ and $A_3$ and the portion $A_S$ arrives at the erasing head 13, the erasing is stopped. Thereafter when the edit-out point $P_2$ arrives at the position of the recording head 14, the recording of the video signal of the scene $B_2$ is stopped, and the video signal of the portion $A_S$ reproduced by the reproducing head 12 and delayed by the delay circuit 16 is recorded on the magnetic tape 11 by the magnetic head 14 through the mixing amplifier 17. Thus, as shown in FIG. 4C, the video signal of the scene $B_2$ is inserted between the scenes $A_1$ and $A_3$ on the magnetic tape 11. In this case, only the small portions $A_E$ and $A_S$ of the scenes $A_1$ and $A_2$ are dubbed and the deterioration of the video signal can be minimized. The above editing operation is the cut effect in which the scene is rapidly changed, but if the video signal level of the scene $A_1$ is gradually decreased at the boundary portion $A_E$ and the video signal level of a head portion of the scene $B_2$ is gradually increased while the level of an end portion of the scene $B_2$ gradually decreased and the level of the scene $A_3$ is gradually increased at the boundary portion $A_S$, a dissolve effect can be obtained as shown in FIG. 4D. Thus, by properly combining two video signals in the mixing amplifier 17, it is possible to attain various effects such as fade, wipe, chroma-key, each kind of keyings (extract synthesis), enlargement, reduction or rotation of a scene and the like, and the expression in production of video program becomes versatile to a great extent. Various kinds of mixing amplifiers for performing such effects have been known.

Figure 5A:
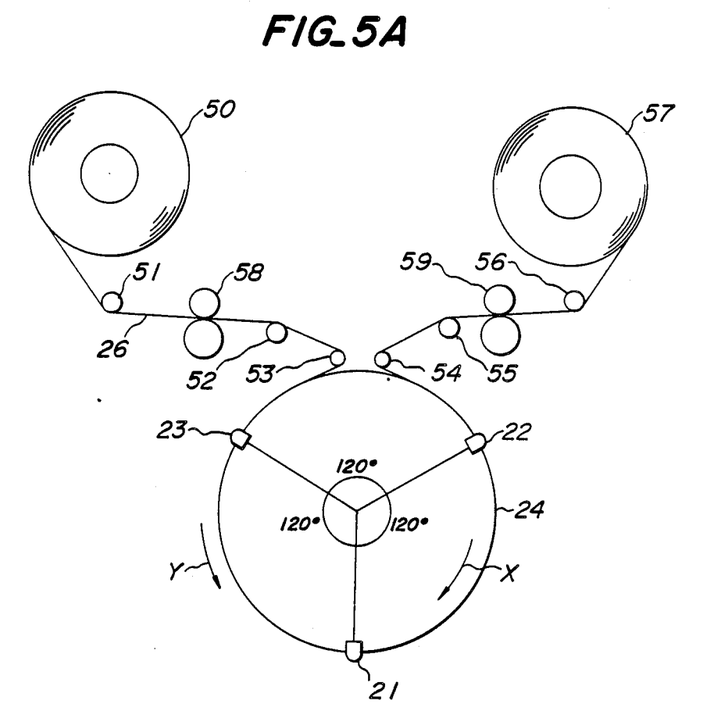
FIGS. 5A and 5B are schematic views showing an embodiment of the video recording apparatus according to the invention.
Figure 5B:
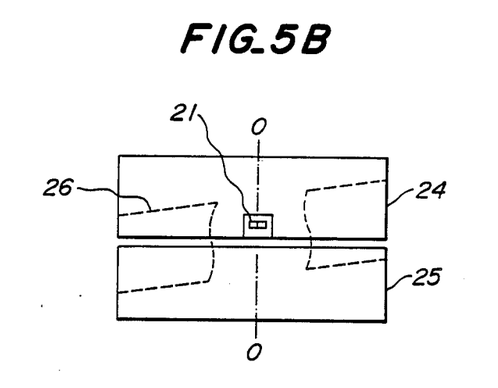

FIGS. 5A and 5B are a schematic plan view and a front view showing the construction of one embodiment of the video recording apparatus of the invention based on a one-inch helical scan type VTR. A reproducing head 21, a recording head 23 and an erasing head 22 are arranged on the circumference of a head drum 24 in this order viewed in a rotational direction X at an angle of 120° with each other. The rotary head drum 24 is arranged above a fixed drum 25, a magnetic tape 26 is helically wound around these drums 24 and 25, such as a α winding or a Ω winding, and is fed at a certain speed in the direction shown by an arrow Y. In this embodiment, the tape 26 is wound in the form of Ω. To this end, the tape wound on a supply reel 51 is taken-up and is guided to the drums 24 and 25 via guide rollers 51, 52 and guide post 53. The tape 26 is helically wound around the drums and is guided to take-up reel 54 via guide post 55 and guide rollers 56 and 57. Between the guide rollers 51 and 52 is arranged a capstan 58, and between the guide rollers 56 and 57 is arranged a capstan 59. The tape reels 50, 54 and the capstans 58, 59 are selectively driven in given direction by means of a driving mechanism. Since such a driving mechanism has been well known in the editing VTR, its detailed construction is not explained further in detail.

In the present embodiment, the reproducing head 21 is not fixed to the rotary head drum 24, but displaceably mounted in the direction parallel to a rotary axis O—O of the head drum. In the known one inch VTRs, an automatic tracking servo mechanism is provided in order that a reproducing head can precisely follow a track recorded on a magnetic tape. To this end a reproducing head is displaced in the direction parallel to the rotary axis of the rotary head drum and an adjusted voltage is applied to a piezo-electric element on which the reproducing head is arranged. However, a range over which the reproducing head can be moved by such automatic tracking servo mechanism is very small. In this embodiment, the automatic tracking servo mechanism is so altered that the reproducing head 21 can be displaced over a long distance in the direction parallel to the rotary axis O—O, and an upper stream track viewed in the tape running direction Y can be scanned.

Figure 6:
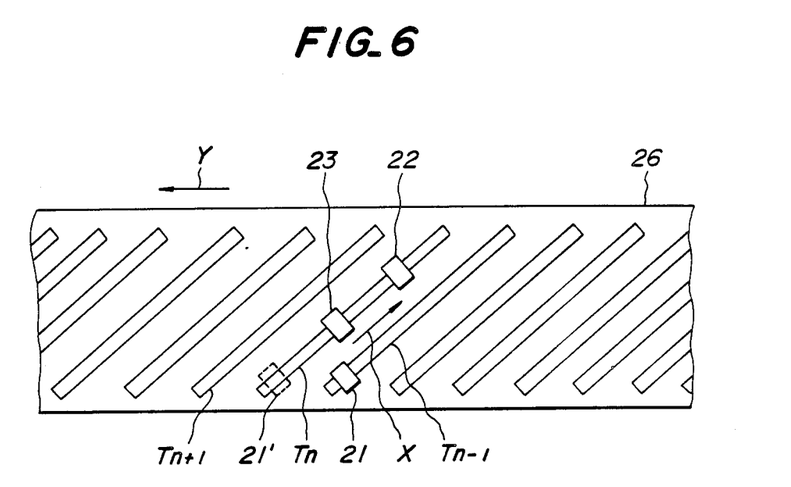
FIG. 6 is a schematic view illustrating a positional relation between magnetic heads and tracks on a magnetic tape.

FIG. 6 shows a relative position of the reproducing head 21, the erasing head 22 and the recording head 23. Each video signal of one field is recorded as respective inclined tracks $T_1$, $T_2$ . . . on the magnetic tape 26. In this embodiment the reproducing head 21 can reproduce a video signal on a track Tn-1 when the erasing head 22 and the recording head 23 scan a track Tn which situates at an upper stream position than the track Tn-1 viewed in the running direction Y of the magnetic tape 26.

Since the magnetic heads 21-23 run in the direction shown by the arrow X, a time interval between the reproducing head 21 and the recording head 23 is equal to $\frac{2}{3}$ field. That is, after a certain point on the magnetic tape 26 is scanned by the reproducing head 21 and a period of $\frac{2}{3}$ field elapases, the same point is scanned by the recording head 23. Therefore, when the video signal reproduced by the reproducing head 21 is supplied to the recording head 25 after delaying the video signal by a time period of $\frac{2}{3}$ field, the video signal is again recorded at the same position as the reproduced position. In FIG. 6, the position of the reproducing head in the known VTR is shown by a numeral 21'. In this embodiment, the reproducing head can be driven to this position 21' by controlling the above modified automatic tracking servo mechanism. In this case, the recording apparatus can be used in the entirely same manner as the common VTR, and the recorded video signal can be monitored by the reproducing head immediately. Such function is generally called the record-simultaneous reproduction. Contrary to this, in the recording apparatus according to the present invention the video signal reproduced by the reproducing head can be recorded by the recording head immediately, after the reproduction, thereby permitting reproduction-simultaneous recording.

The above embodiment has such an advantage that the recording apparatus can be obtained by slightly modifying the existing one-inch helical VTR, but in case of newly designing a one-inch helical VTR having the reproduction-simultaneous recording function according to the invention, it is possible to provide an extra reproducing head in addition to the existing reproducing head for monitoring. In this case, the extra reproducing head may be positioned on the upper stream side of an the recording head not only by one track viewed in the tape running direction, but also by two or more tracks. Hence, when the extra reproducing head is positioned on the upper stream side by n tracks (n=1, 2 . . . ) with respect to the recording head, the delay time of the delay circuit should be equal to $(n-1+\frac{2}{3})$ fields.

In the above embodiment, the head drum is composed of the rotary head drum and fixed drum, but the head drum may be composed of stationary drums and a rotary disc with a magnetic head arranged therebetween, or the head drum may be composed of a single rotary drum.

Figure 7:
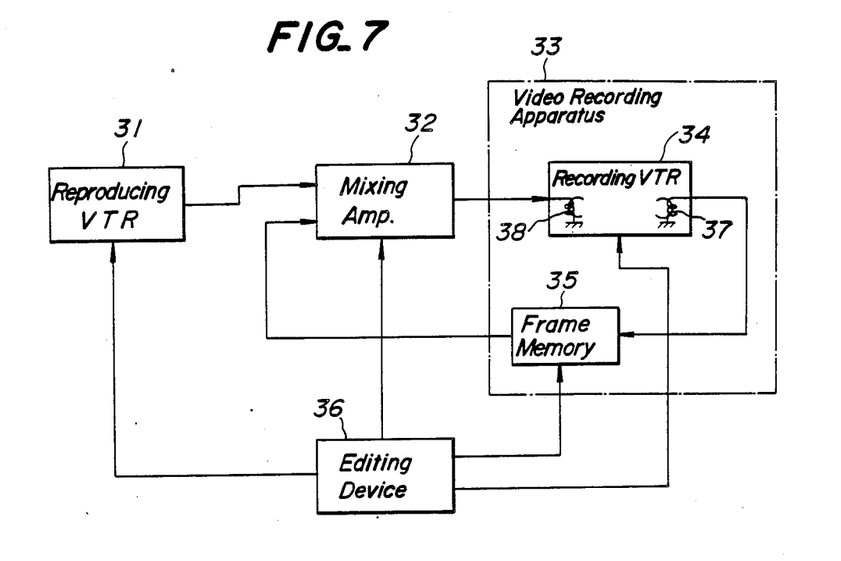
FIG. 7 is a block diagram depicting the video editing system comprising the video recording apparatus according to the invention.

FIG. 7 is a block diagram showing the construction of one embodiment of the editing system assembled with the video recording apparatus according to the invention. A video signal reproduced by a reproducing VTR 31 is supplied to the video recording apparatus 33 according to the invention through a mixing amplifier 32. This video recording apparatus 33 comprises a recording VTR 34 having the construction shown in FIG. 5 and a frame memory 35 for delaying a video signal reproduced by a reproducing head 37 of the recording VTR 34 by a period of $\frac{2}{3}$ field. This delayed video signal is recorded by a recording head 38 of the recording VTR 34 through the mixing amplifier 32. Further, the reproducing VTR 31, the mixing amplifier 32, the recording VTR 34 of the video recording apparatus 33 and the frame memory 35 are controlled by an editing device 36 and are synchronously driven, so that various editing effects are performed.

In case of effecting the editing by means of this editing system, the magnetic tapes 11 and 11' shown in FIGS. 4A and 4B having video signals previously recorded thereon are loaded on the recording VTR 34 and the reproducing VTR 31, respectively. At first, the end of the scene $A_1$ of the magnetic tape 11 loaded on the recording VTR 34 is found and the tape is pre-rolled, and the beginning of the scene $B_2$ of the magnetic tape 11' set at the reproducing VTR 31 is sought and the tape is pre-rolled. Then, the reproducing VTR 31 and the recording VTR 34 are synchronously operated, and the video signal reproduced by the reproducing head 37 and delayed by $\frac{2}{3}$ field in the frame memory 35 is re-recorded on the tape 11 until the last field of the scene $A_1$ is recorded. Then, the video signal of the scene $B_2$ of the magnetic tape 11' reproduced by the reproducing VTR 31 is recorded on the magnetic tape 11 by the recording head 38 through the mixing amplifier 32. This recording is carried out until the scene $B_2$ is completed. In case of carrying out the dissolve as shown in FIG. 4D, the video signal reproduced by the recording VTR 34 and delayed by the frame memory 35 is mixed with the video signal reproduced by the reproducing VTR 31 by the mixing amplifier 32 in such a manner that gains of these video signals are gradually changed in opposite directions. By controlling the mixing mode in the mixing amplifier 32 this manner, it becomes possible to attain special effects such as fade-in, fade-out, wipe, chroma-key, each kind of keyings, reduction, enlargement and rotation of the picture. The processing of signals in the mixing amplifier for these effects is entirely the same as the case of the known editing system shown in FIG. 1 and the detailed explanation thereof is omitted. Therefore, the editing system shown in FIG. 7 is the same as the known editing system shown in FIG. 1 in function, but is simple in construction, small in size and cheap in cost because only two VTRs are required. In the video recording apparatus according to the invention, one VTR serves as a reproducing VTR as well as a recording VTR, and a reproduced video signal is always recorded on the magnetic tape at the same position where the relevant video signal has been recorded. Therefore the image signal recorded on the magnetic tape 11 is not disturbed after the editing because there is no skipping and overlapping of frames. Moreover, since the editing device does not require specially high precision, the apparatus becomes simple and cheap and the required editing time is shortened.

Figure 8:
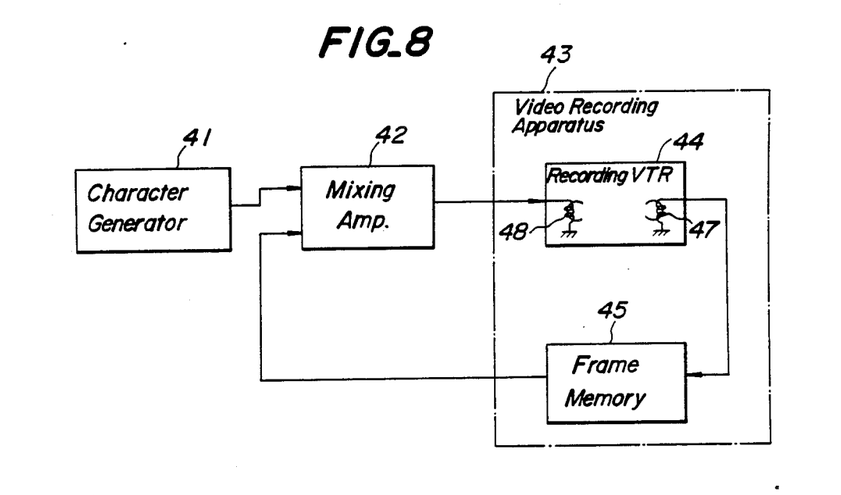
FIG. 8 is a block diagram illustrating the character superimposing system comprising the video recording apparatus according to the invention.

FIG. 8 is a block diagram showing the construction of another embodiment of the editing system comprising the video recording apparatus according to the invention for superimposing characters and symbols on the picture image. A character signal from a character generator 41 is supplied to a video recording apparatus 43 of the invention through a mixing amplifier 42. The video recording apparatus 43 comprises a recording VTR 44 having the reproduction-simultaneous recording function, and a frame memory 45 for delaying the image signal reproduced by a reproducing head 46 over a period of $\frac{2}{3}$ field. The video signal reproduced by the head 46 and delayed by the frame memory 45 is supplied to a recording head 48 of the recording VTR 44 through the mixing amplifier 42, and is recorded on the magnetic tape at the same position where the relevant signal is reproduced.

In case of using the video editing system of this embodiment, a master magnetic tape is loaded on the recording VTR 44 and the video signal reproduced by the reproducing head 46 and delayed by $\frac{2}{3}$ field by the frame memory 45 is mixed with a character signal supplied from the character generator 41 in the mixing amplifier 42, and the mixed video signal is recorded by the recording head 47 on the master tape at the same position at which the relevant video signal was recorded. As compared with the known editing system illustrated in FIG. 2, according to the invention, it is sufficient to dub only the video signal on which the character is to be superimposed, so that the editing time is extremely shortened and deterioration of the video signal by dubbing can be minimized. Further, since only one VTR is required, the construction is simple and cheap.

In the embodiments so far explained the video recording apparatus according to the invention is constructed as a broadcasting apparatus, but the invention may be equally applied to a home video camera system. In this case, a video camera is provided as a video signal source in addition to the character generator 41 in the editing system shown in FIG. 8, and the delay time of the frame memory 45 is made at least one frame. In addition, there are prepared several kinds of mixing effects in the mixing amplifier and any desired one of these effects may be selected by simple operation. For example, in case of giving the dissolve effect between successive scenes, a scene is taken by the camera in a usual mode and is recorded on a magnetic tape. Then the tape is rewound by several seconds, and the next scene is taken by the camera and a video signal is recorded on the tape in the reproduction-simultaneous recording mode, while the dissolve mode is selected in the mixing amplifier. In this case, the gain of the video signal reproduced by the reproducing head is gradually decreased at a predetermined ratio, and the gain of the video signal from the video camera is gradually increased, thereby obtaining the desired dissolve effect. In the same manner, the mixing action of video signals in the mixing amplifier is controlled by a microprocessor so as to obtain a fade effect other than the dissolve effect. Further, when the write-in and read-out at the frame memory 45 are controlled by the microprocessor, it is possible to obtain advanced effects such as wipe, chroma-key, enlargement, reduction and rotation. Such functions could never be obtained by the known home video camera system. According to the invention, when the delay time in the frame memory is set to at least one frame period, various picture image processings can be performed by controlling the write-in and read-out of the frame memory, and in this case, the original video signal is always synchronized with the processed video signal, and as a result, a necessary condition for the synchronization imposed to the whole system is considerably mitigated and thus the system can be simply and cheaply composed.

The invention is not limited to the above embodiments, but can be altered or modified variously. For example, in the embodiment shown in FIG. 8, the superimposition of characters is effected, but noise reduction and chromatic aberration correction may be performed throughout the whole video signal. In the known system such a treatment requires two sets of VTRs. The embodiment shown in FIG. 5 uses the one-inch helical VTR as a base, but also uses any other optional VTR such as two-inch four-head VTR, $\frac{3}{4}$-inch cassette VTR, $\frac{1}{2}$-inch VTR, fixed head VTR and the like.

The advantages of the video recording apparatus according to the invention are summarized as follows.

(1) The reproduction-simultaneous recording function is given to a single VTR and a reproduced signal is re-recorded on the same tape at the same position as that from which the signal is reproduced, so that in case of constructing the editing system, one VTR is saved, and hence the apparatus is simple in construction, small in size and cheap in cost.

(2) In case of assembling the editing system, a signal reproduced from the magnetic tape loaded on the video recording apparatus of the invention is completely synchronized with a recorded signal after delaying the reproduced signal, so that the editing device for controlling each portion does not require any precise synchronization, and hence the apparatus becomes cheap and simple.

(3) In case of processing a part of the magnetic tape already edited as a master tape, the whole program has hitherto been dubbed by taking a long period of time and encountering deterioration of video signals, but the invention treats only necessary portions of the tape, so that the treating time is largely shortened and deterioration of picture images can advantageously be minimized.

(4) Since the number of VTRs can be reduced, the number of magnetic tapes can certainly be reduced, so that stock, management and care of magnetic tapes are greatly simplified in production of a broadcasting station.

What is claimed is:

1. A video recording apparatus, comprising:

magnetic tape feeding means for feeding a magnetic tape along a predetermined helical tape feeding path at a given speed in a given direction, said magnetic tape feeding means comprising a rotary member including a rotary drum arranged coaxially with a fixed drum, said rotary and fixed drums defining the helical tape feeding path;

a recording magnetic head arranged on said predetermined helical tape feeding path for recording a video signal on the magnetic tape;

a reproducing magnetic head arranged on said predetermined helical tape feeding path at an upper stream position than the recording magnetic head viewed in said magnetic tape feeding direction and for reproducing a video signal recorded on the magnetic tape;

an erasing magnetic head arranged on said predetermined path between said recording magnetic head and said reproducing magnetic head for selectively erasing the video signal recorded on the magnetic head; and delay means for delaying the video signal reproduced by said reproducing magnetic head by such a time period that a video signal delayed by the delay means is recorded by said recording magnetic head on the magnetic tape at the same position where the relevant video signal is reproduced, said recording, erasing and reproducing magnetic heads being equidistantly arranged on the rotary drum in sequential order when viewed in a rotational direction of the rotary drum, the magnetic tape being wound helically around the rotary and fixed drums and fed in a direction opposite to the rotational direction of the rotary drum so that a video signal of one field is recorded on the magnetic tape as a single inclined track, said reproducing head being shifted in an axial direction of the rotary and fixed drums with respect to the recording and erasing heads such that the reproducing magnetic head scans a track which is situated at an upper stream position relative to a track which is scanned by the recording and erasing heads when viewed in the feeding direction of the magnetic tape by n tracks (n=1, 2 ...), and said delay means delaying the video signal by a time period equal to $(n-1+\frac{2}{3})$ fields.

2. A video recording apparatus according to claim 1, wherein said reproducing magnetic head is arranged on the rotary drum movably in the axial direction of the drum.

3. A video recording apparatus according to claim 1, wherein said reproducing and recording magnetic heads are so arranged that they scan adjacent tracks on the magnetic tape at the same time, and said time period of the delay means is set to $\frac{2}{3}$ field.

4. A video recording apparatus according to claim 1, further comprising an additional reproducing magnetic head which is arranged on the surface of the rotary drum at such a position that the video signal recorded by the recording magnetic head is reproduced by the additional reproducing magnetic head immediately after the video signal is recorded.

5. A video recording apparatus according to claim 1, wherein said delay means comprises a frame memory.

6. A video recording apparatus according to claim 1, further comprising a mixing amplifier having a first input connected to an output of the delay means, a second input and an output connected to said recording magnetic head, and an input terminal connected to said second input of the mixing amplifier and to a video signal source such as a video tape recorder, television camera, character generator or the like.

7. A video recording apparatus according to claim 6, further comprising an editing device for maintaining the magnetic tape feeding means, delay means and mixing amplifier in synchronism with each other.

8. A video recording apparatus according to claim 7, wherein said mixing amplifier is so constructed that video signals supplied to the first and second inputs are selectively supplied to the recording magnetic head to perform a cut effect.

9. A video recording apparatus according to claim 6, wherein said mixing amplifier is so constructed that levels of video signals supplied to the first and second inputs are changed in opposite directions and a mixed video signal is supplied to the recording magnetic head to perform a dissolve effect.

* * * * *